Nov. 29, 1955  W. DAVIES  2,724,901
DEVICE FOR MEASURING THE INDEX ANGLES OF TAPS
Filed July 30, 1954  4 Sheets-Sheet 4
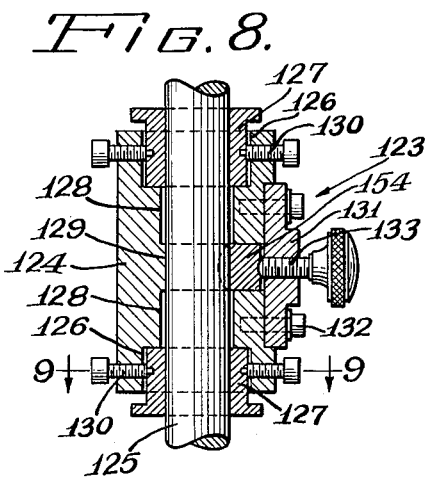
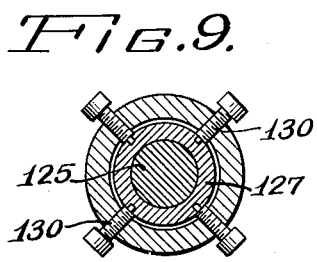
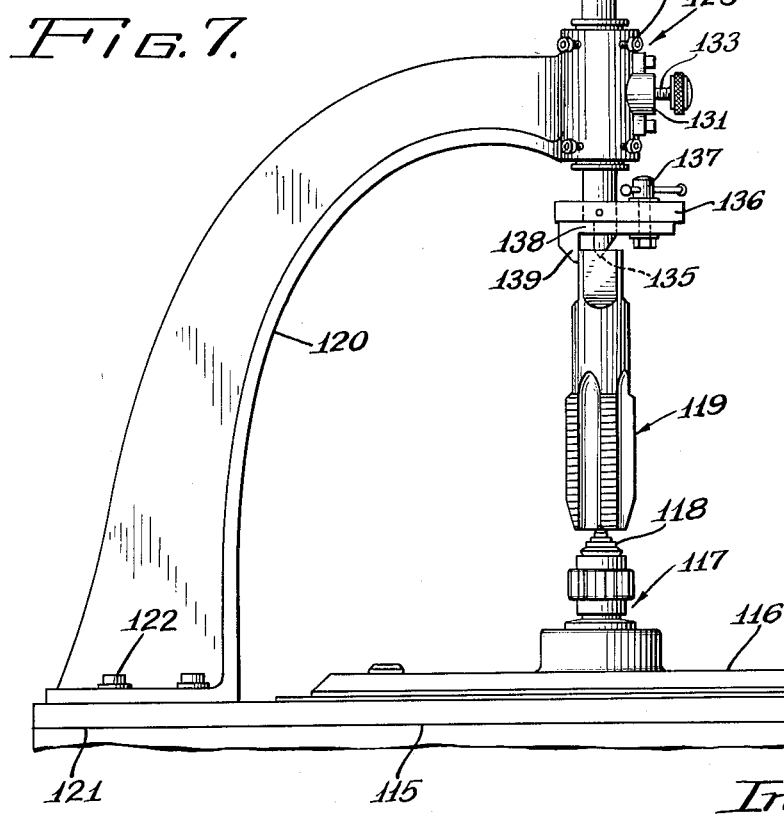
Inventor:
Wayne Davies
By Gary, Desmond & Parker
Attys.

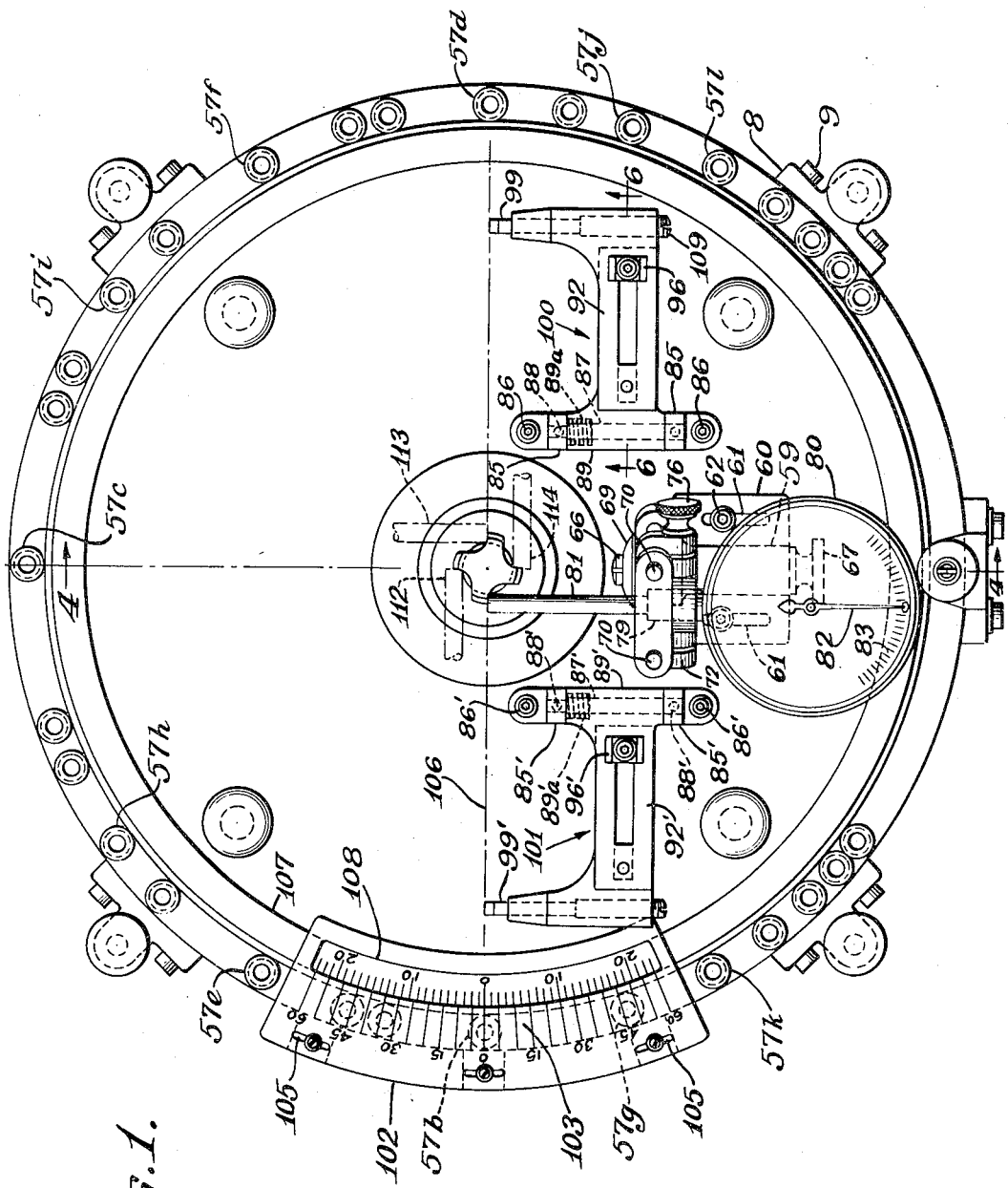

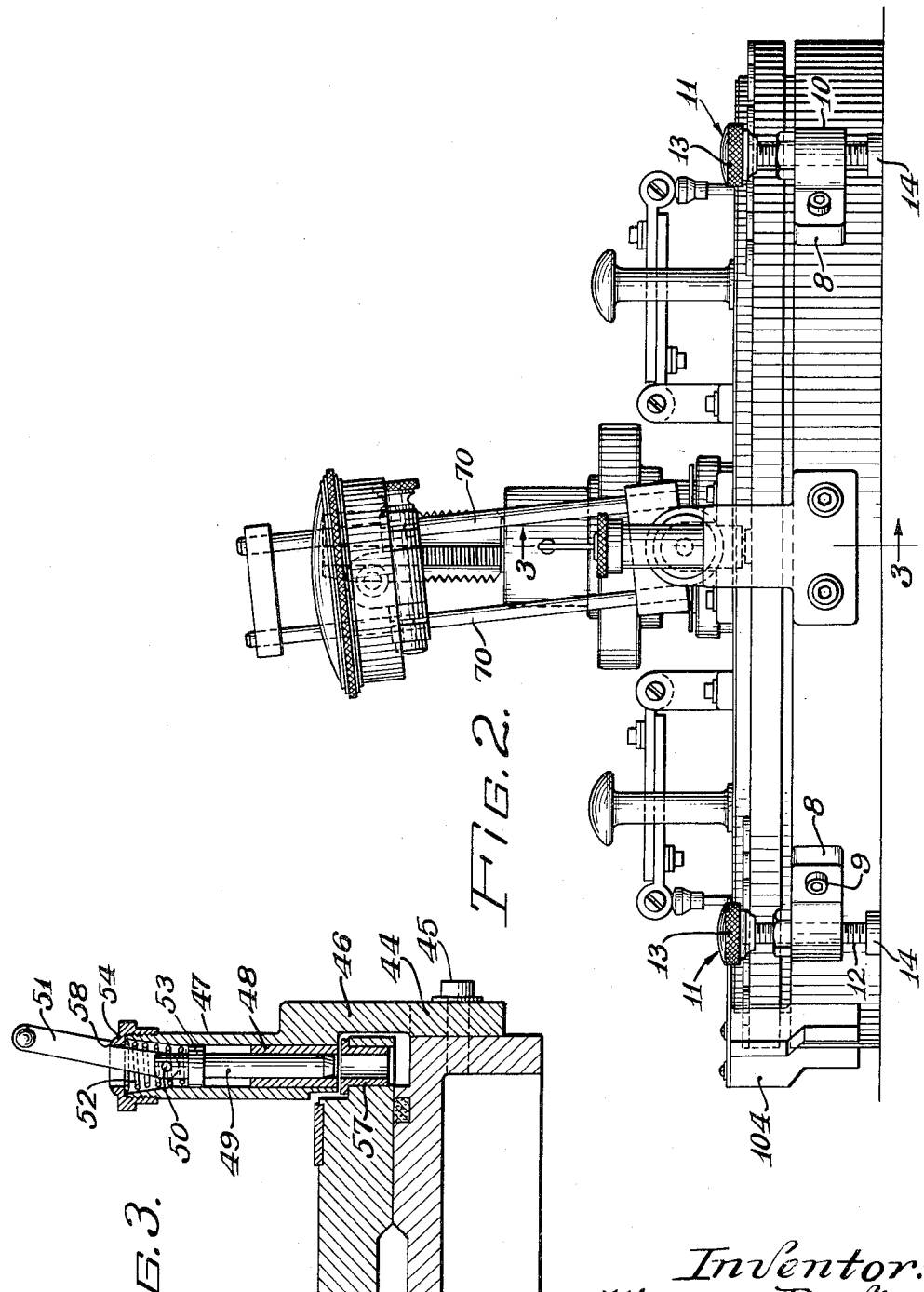

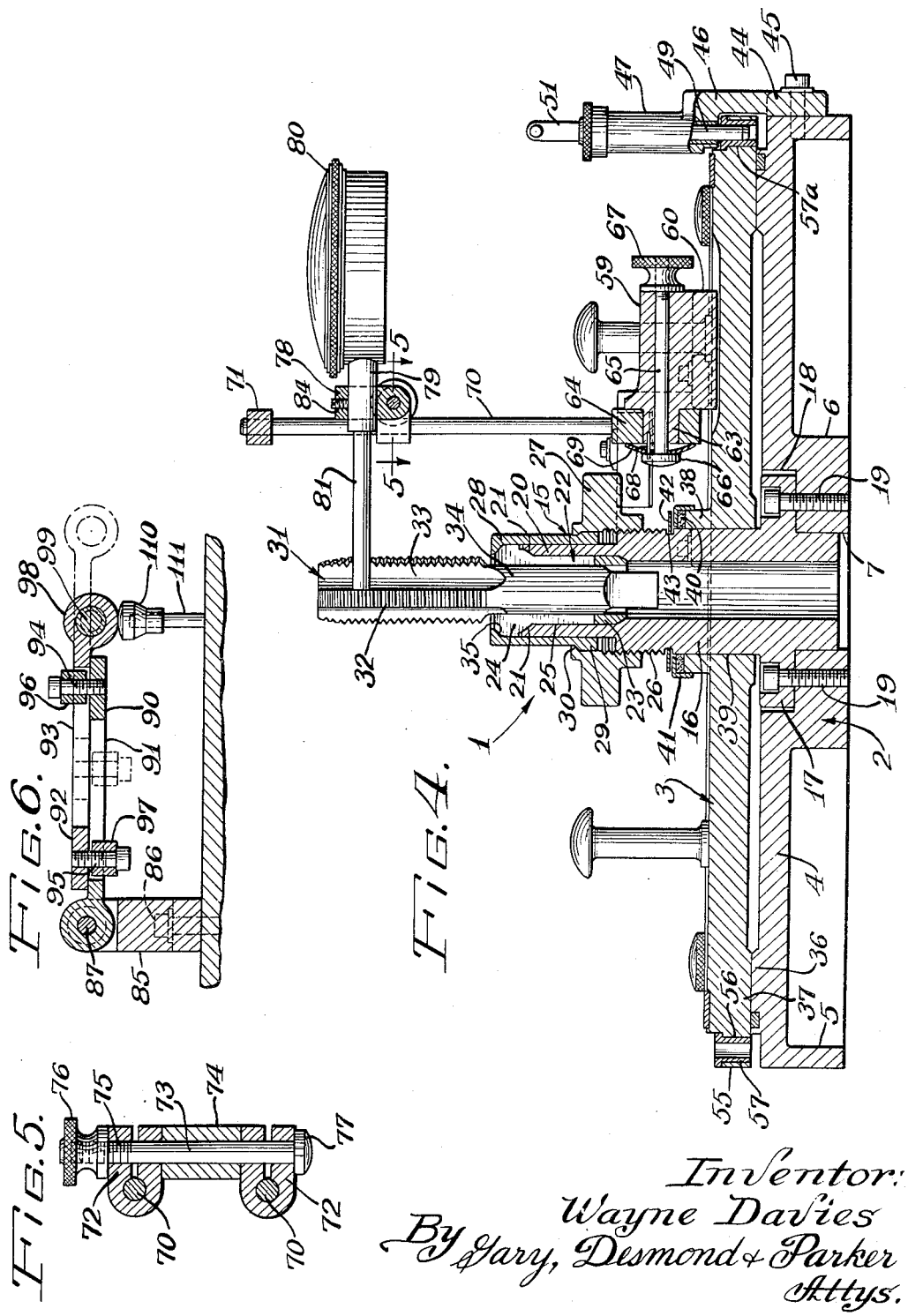

United States Patent Office 2,724,901
Patented Nov. 29, 1955

2,724,901

DEVICE FOR MEASURING THE INDEX ANGLES OF TAPS

Wayne Davies, Evanston, Ill.

Application July 30, 1954, Serial No. 446,761

12 Claims. (Cl. 33—201)

This invention relates to improvements in a device for measuring the index angle of taps, and refers particularly to a device with which the index angle of a tap may be measured quickly and with extreme accuracy.

Taps for threading the walls of apertures are usually provided with two or more flutes which are cut parallel to the axis of the tap through the threaded portion thereof. Thus, one classification of taps refers to the number of flutes in the taps, for instance, a two-flute tap, a three-flute tap, etc. In the use of a tap it is of vital importance that the threaded portions or lands of the tap be equi-angular distances from each other, for instance, that in a two-flute tap, the leading cutting edges be spaced 180° from each other or that the cutting edges of a four-flute tap be spaced 90° from each other, etc.

Of course, manufacturers of taps attempt to maintain predetermined tolerances, but it frequently happens that in the grinding and polishing of the flutes, the desired angular relationship is altered to an extent that the tap cannot be used for precision work.

The present invention contemplates a device for quickly and accurately measuring the angles between adjacent cutting edges of the taps, these angles being referred to as "index angles."

Further objects, advantages and features of the present invention will be apparent from the accompanying drawings and following detailed description.

In the drawings,

Fig. 1 is a top plan view of my improved measuring device;

Fig. 2 is a front elevational view of the device shown in Fig. 1;

Fig. 3 is an enlarged detailed sectional view taken on line 3—3 of Fig. 2;

Fig. 4 is a sectional view taken on line 4—4 of Fig. 1;

Fig. 5 is an enlarged detailed sectional view taken on line 5—5 of Fig. 4;

Fig. 6 is an enlarged detailed sectional view taken on line 6—6 of Fig. 1.

Fig. 7 is a side elevational view of a modified means for holding the tap to be tested.

Fig. 8 is a detailed sectional view taken through the tap centering means shown in Fig. 7.

Fig. 9 is a transverse sectional view taken on line 9—9 of Fig. 8.

Referring in detail to the drawing, 1 indicates generally my improved measuring device which comprises a base 2 and a turntable 3 mounted for rotation upon the base. The base 2 comprises a substantially circular platform 4 which carries at its periphery a downwardly extending annular flange 5. Adjacent the central portion of the platform 4 a downwardly extending boss 6 is carried, said boss being provided with a central aperture 7.

A plurality of brackets 8 are secured to the outer face of the flange 5 by screws 9 or the like, each bracket carrying a threaded sleeve 10. The brackets 8 are circumferentially spaced 90° from each other and each sleeve carries a leveling member 11. Each leveling member 11 comprises a threaded shank 12 which engages with the threads of each sleeve, a knob 13 being carried at the upper end of each shank whereby the shank may be conveniently rotated. A foot 14 is carried at the lower end of each shank 12, each foot being rotatable independently of the shank upon which it is carried. Thus, the base 2 may be supported upon the feet 14 to level the base.

A chuck 15 is rigidly mounted upon the base 2, said chuck comprising a tubular member 16, the lower portion of which is adapted to be positioned in the aperture 7 in the base. The tubular member carries an integral outwardly extending annular flange 17 which is positioned in a circular recess 18 provided in the upper face of the base 2. A plurality of screws 19 are carried by the flange 17 and are adapted to make threaded engagement with the boss 6 of base 2 whereby the chuck may be rigidly secured to the base and extend vertically therefrom.

The upper portion of the tubular member 16 terminates in a relatively thin wall annular tube 20, the upper edge portions of which are chamfered inwardly, as indicated at 21 in Fig. 4. A collet 22 is adapted to be positioned within the relatively thin walled portion of the tube 16, said collet having an annular lower portion 23 and an upper portion 24 which is provided with a plurality of longitudinal slots 25.

The external portion of the tubular member 16 carries screw threads 26 with which a lock nut 27 is adapted to engage. A retaining member 28 circumscribes the upper portion of the tubular walls 20 and at its lower portion carries an outwardly extending annular flange 29 which is engageable by an overhanging shoulder 30 of the lock nut 27.

In operation, a tap 31 is adapted to be positioned in the tubular member 16, the tap 31 having threaded lands 32 and longitudinal flutes 33 which space said lands circumferentially from each other. The lower portion of the tap 31 comprises a substantially cylindrical shank 34 which is positionable within the chuck 15. The shank 34 is disposed within the split collet 24 and the nut 27 is manipulated to draw the retaining member 28 downwardly against the upper portion of the split collet, the retaining member having an inwardly extending annular shoulder 35 which bears upon the upper portion of the split collet 24. In urging the collet downwardly, the collet engages the tapered or chamfered shoulder 21 and thus the split collet is urged radially inwardly with respect to the shank 34 thereby firmly gripping said shank which is maintained substantially coaxial with respect to the tubular member 16. In this fashion the tap 31 is disposed in position whereby the index angles thereof may be measured.

As has been hereinbefore described, the turntable 3 is rotatable with respect to the base 2. The platform 4 of the base 2 carries an upwardly extending annular bearing portion 36 upon which a downwardly extending annular bearing portion 37 formed upon the lower face of the turntable 3 is adapted to rest. In this fashion the turntable 3 is supported for rotation upon the base 2, the bearing portions 36 and 37 being slidably related to each other.

The central portion of the turntable 3 carries an upwardly extending boss 38 and the central portion of the turntable, including the boss 38, is provided with a central aperture 39 through which the tubular member 16 extends. An annular dust seal 40 which may comprise a felt washer or the like is positioned upon the upper portion of the boss 38 and is retained in position thereon by collar 41. A retaining ring 42 is positioned in an annular groove 43 provided in the exterior wall of the tubular member 16, said ring preventing unintended axial movement of the turntable 3 with respect to the tubular member 16.

A bracket 44 is secured by means of screws 45 to flange 5 of the base 2. The bracket 44 carries an upwardly extending standard 46 which in turn carries a cylindrical member 47, shown in detail in Fig. 3. A tubular sleeve 48 is positioned within the tubular member 47 and an indexing pin 49 is slidably positioned within the tube 48. The upper end of the indexing pin 49 is pivotally secured, as at 50, to a control handle 51. A coil spring 52 is confined within the tubular member 47 and bears at one end upon head 53 comprising a portion of the indexing pin 49 and at the other end said spring bears against a retaining nut 54 which threadedly engages the upper end of the tubular member 47.

The turntable 3 adjacent its periphery carries a relatively depressed annular portion 55. The annular portion 55 is provided with a plurality of apertures 56 and in each aperture a tubular sleeve bushing 57 is positioned. As will be hereinafter more fully described, the bushings 57 are constructed of hardened steel and are employed to index properly the turntable 3 with respect to the base 2. The depressed portion 55 of the turntable 3 is positioned immediately beneath the tubular member 47 and by the proper manipulation of the turntable 2, said turntable can be so moved as to dispose an aperture defined by a bushing 57 in coaxial relationship with the indexing pin 49. The control arm 51 which is pivotally secured to the upper end portion of the indexing pin 49 is provided with a notch 58 which is engageable with the upper edge of the retaining nut 54. Thus by pulling upwardly upon the handle 51, thereby compressing spring 52, and then by rocking the handle 51, in a clockwise direction, as viewed in Fig. 3, the notch 58 may be brought into engagement with the upper edge of the retaining nut 54. In this fashion the pin 49 may be held in upward position during the period that the turntable 3 is rotated relative to the base 2. When, however, the turntable has been so rotated as to dispose the pin 49 above a desired bushing 57, the control arm 51 may be so rocked as to disengage itself from the nut 54 and spring 52 will then urge the indexing pin 49 downwardly causing said pin to engage in the aperture defined by the selected bushing 57. As has been hereinbefore described, the turntable 3 carries a plurality of bushings 57 whereby the turntable may be locked by the indexing pin 49 at desired positions relative to the base 2.

A block 59 is mounted upon the upper face of the turntable 3, said block being carried by a supporting plate 60. The longitudinal axis of the block is adapted to be disposed in substantial radial alignment with the tube 16 and the indexing pin 49. Plate 60 which carries the block 59 is provided with a pair of elongated recesses 61 in which screws 62 are adapted to be positioned, said screws being threadedly engaged in the turntable. The arrangement is such that the block 59 may be moved toward or away from the tubular member 16 and may be locked in a desired position relative to said tubular member.

The block at the end thereof which is adjacent the tubular member 16 comprises a bearing 63 upon which a bearing block 64 is rotatably mounted. The block 59 is provided with an axial aperture for the reception of a locking bolt 65. The bolt 65 carries a head 66 at one end thereof and is provided with screw threads at the opposite end which are engageable with a knurled locking nut 67. A pin 68 is carried upon the bearing member 63 and projects outwardly therefrom. A spring washer 69 is positioned upon bolt 65 adjacent head 66, pin 68 extending through an aperture in the spring washer and also extending through a slot provided in the head 66. The arrangement is such that when the adjusting nut 67 is manipulated the spring washer 69 bears upon the bearing block 64 and frictionally holds said block in a desired position upon the bearing 63. By the provision of pin 68 the bolt 65 is prevented from being turned during the manipulation of the nut 67.

The bearing block 64 carries a pair of spaced rods 70 which extend upwardly from said block. At the opposite or upper ends of the rods 70, said rods are maintained in desired spaced parallel relationship by means of the spacer block 71.

A pair of split sleeves 72 (Fig. 5) are carried upon rods 70 intermediate their length. A bolt 73 extends through the split portions of both sleeves 72 and a gauge supporting member 74 is positioned between the sleeves 72, said gauge supporting member also being carried upon an intermediate portion of bolt 73. One end of bolt 73 carries screw threads 75 which are engageable by a knurled nut 76. The opposite end of the bolt 73 carries a head 77 which bears upon one of the sleeves 72.

The arrangement is such that the sleeves 72 and gauge supporting block 74 may be moved lengthwise along the rods 70. In addition, the gauge supporting block is rotatable upon bolt 73. When the sleeves 72 and block 74 have been moved to a desired position along the length of the rods 70 and the gauge supporting block 74 has been rotated to a desired position relative to bolt 73, the entire assembly may be locked in such position by the manipulation of the nut 76 which locks the sleeves upon the rod 70 and also locks the gauge supporting block 74 between the split sleeves 72.

The gauge supporting block 74 is provided with a collar portion 78 into which sleeve 79 of gauge 80 is slidably positioned. As will be hereinafter more fully described, the gauge 80 is a conventional dial indicator, the actuating rod 81 being slidably positioned in sleeve 79 to manipulate the mechanism of tthe gauge and to actuate gauge pointer 82 which moves over the calibrated scale 83 carried upon the face of the gauge. The gauge sleeve 79 may be secured to collar 78 and locked in place by a conventional set screw 84. In this fashion the end of the actuating rod 81 may be disposed in a desired position relative to tap 31 in order to effect the measurement of the index angles of the tap as will be hereinafter more fully described.

A pair of spaced standards 85 are mounted upon the upper face of turntable 3 at one side of the gauge-supporting assembly, herebefore described, the standards being secured to the turntable 3 by means of screws 86, or the like. A shaft 87 is carried at its opposite end portions in the standards 85, said shaft being locked in said standards by set screws 88. A sleeve 89 rotatably embraces shaft 87 between the standards and carries an outwardly extending arm 90 provided with an elongated slot 91. A compression coil spring 89a embraces shaft 87 and urges sleeve 89 into resilient contact with one of the standards. An extension arm 92 is slidably carried upon arm 90 and the extension arm is also provided with an elongated slot 93. A screw 94 is threadedly positioned upon an end portion of arm 90 and extends through slot 93. Similarly, a screw 95 is threadedly carried by an end portion of extension arm 92 and projects through slot 91. A locking lug 96 is carried by screw 94 and a similar locking lug 97 is carried by screw 95.

The arrangement is such that extension arm 92 may be moved longitudinal with respect to arm 90 and the arms may be locked in desired position relative to each other by the manipulation of screws 94 and 95 which fasten the locking lugs 96 and 97 upon the respective arms. Thus, the extension arm may be secured to arm 90 in a contracted position, as shown in full lines in Fig. 6, or said extension arm may be secured to arm 90 in a more or less extended position, as shown in broken lines in said figure.

A sleeve 98 is formed at the outer end of the extension arm 92 and an alignment pin 99 is threadedly positioned in said sleeve. Thus, the projecting end of the alignment pin may be adjusted outwardly or inwardly with respect to sleeve 98, for a purpose to be hereinafter more fully described. For purposes of clarity in description the apparatus hereinbefore described for carrying the alignment pin 99 will be hereinafter referred to as the "right-hand alignment mechanism 100."

An alignment mechanism 101 identical with the right-hand alignment mechanism 100 is positioned upon the turntable 3 on the opposite side of the gauge-supporting device. The parts comprising the alignment mechanism 101 are identical in shape, position and relationship to the parts comprising the right-hand alignment mechanism, and without further description corresponding primed reference numerals will be applied to the corresponding parts in the alignment mechanism 101. The alignment mechanism 101 will be hereinafter referred to as the "left-hand alignment mechanism 101."

A vernier scale 102, having calibrations 103 in minutes, is secured to brackets 104 which, in turn, are mounted upon the flange 5 of the base 3. The scale 102 is provided with spaced arcuate slots 105 whereby the zero of the scale may be disposed in alignment with the diametral line 106. A protractor band 107, which is calibrated in degrees, is carried upon the turntable 3 and the scale 102 carried by the base is provided with an arcuate viewing slot 108 immediately above band 107 whereby the calibrations on the band may be observed. As has been hereinbefore described, the axis of block 64 is on a radial line which passes through the axis of pin 49. The device is so constructed that when pin 49 is engaged in bushing 57a (Fig. 4) the zero of the protractor band scale is in alignment with the zero on the vernier 102 and in alignment with line 106. Thus, by means of the vernier 102 and protractor band 107 the angular position of the turntable with respect to the base may be read in degrees and minutes.

In utilizing the present device to measure the index angles of taps, the device first must be set in operative position, more specifically with pin 49 in bushing 57a, the ends of the pins 99 and 99' should be so adjusted as to lie in a vertical plane which includes the line 106. A convenient way of adjusting the pins 99 and 99' is to insert into the chuck 15 a test block (not shown). The test block conveniently comprises a semi-cylindrical member carried by a shank. The shank is inserted in the collet 24 and the nut 27 is tightened to lightly hold the test block. The semi-cylindrical member is so positioned that its flat surface lies in a vertical plane which includes the line 106. To assure that the flat portion of the test block lies in this plane, the actuating rod of the indicator 80 may be made to contact said flat surface transversely across its face. By observing the pointer 82 the coincident position of the flat face of the test block and the reference plane may be determined and the nut 27 may then be tightened to securely hold the test block.

With the test block secured in the chuck in the desired position the right hand alignment mechanism 100 may be so manipulated as to swing arms 90 and 92 about the shaft 87 until the end portion of the pin 99 is disposed adjacent the flat surface of the test block. As has been hereinbefore described the member 99 is threadedly positioned in arm 92 and hence by properly manipulating the threaded end 109 of the alignment pin 99, said pin can be brought into contiguous relationship with the flat portion of the test block. When the pin is so adjusted the end of said pin will lie in a vertical plane which includes the line 106. The left-hand alignment mechanism 101 may then be similarly adjusted to position the end of the alignment pin 99' in a vertical plane which includes the line 106. In this fashion the ends of both pins 99 and 99' are properly adjusted and the flat surfaces of said ends lie in the vertical plane which includes the line 106.

The test block may then be removed from the chuck 15 and a tap, such as the four-fluted tap 31 may be positioned in the chuck. The nut 27 may be tightened so that the collet 24 grips the shank 34 of the tap. However, the initial gripping action is such that the tap may be rotated within the collet. The tap 31, illustrated, is a right hand tap, that is, a tap for cutting right-hand threads. Accordingly, the left-hand alignment mechanism 101 is employed to orient the tap in the chuck. This operation comprises swinging the arms 90' and 92' about the shaft 87' to bring the end of the alignment pin 99' adjacent the leading edge of one of the threaded lands. The tap may then be rotated in the collet 24 to bring the leading edge of said tap into contact with the end of the alignment pin 99'. With the tap so located, the nut 27 is tightened to securely hold the tap in this position within the chuck 15. The left-hand alignment mechanism may then be swung to inoperative position and the end portion thereof may conveniently rest upon a head 110 carried at the upper end of pin 111 which is mounted upon the turntable 3.

The tap 31 is then disposed in position to have its index angles measured. After the tap 31 has been disposed in desired position the actuating rod 81 of the gauge 80 may be brought into contiguous relationship with the leading edge of the tap 31, as illustrated in Figs. 1 and 4. During the time that the left-hand alignment mechanism 101 has been employed to orient the tap 31 the actuating rod, which in conventional indicating gauges is retractible, may be retracted to remove the actuating rod 81 from the path of travel of the alignment mechanism. After the left-handed alignment mechanism 101 has been moved to inoperative position the actuating rod may be extended to contacting relationship with the leading edge of the tap. With the actuating rod 81 in contact with the leading edge of the tap 31, the pointer 82 of the gauge 80 is set to zero position, as illustrated in Fig. 1.

The tap 31 is a four-flute tap and hence four measurements are adapted to be taken to determine the index angles thereof. To accomplish this operation, the actuating rod 81 is retracted after the zero position is set in order to remove the actuating pin 81 from its contiguous position upon the leading edge of the tap. The pin 49 is then raised out of engagement with the bushing 57a and the turntable is rotated in a clockwise direction as viewed in Fig. 1, until the pin 49 is in coaxial position with the bushing 57b. The pin is then lowered into the bushing and the actuating rod may be moved to extended position to bring the end of the actuating rod 81 into contact with the next adjacent land as indicated at 112 in Fig. 1. The reading of the gauge 80 is then noted. If the distance between the adjacent lands is exactly 90° the pointer 82 will remain at zero upon the gauge 80. However, if there is an error in the position of the second land measured the error will be noted upon the scale 83 of the gauge, that is, the pointer 82 will dispose itself on one side or the other side of the zero mark. In actual practice, calibrations of the gauge 80 are in ten thousandths of an inch and consequently the deviation from perfection will be measured in terms of ten thousandths of an inch upon the gauge 80.

The gauge mechanism may be again manipulated to disengage the actuating rod 81 from the second land and the turntable may be swung in order to permit the positioning of the pin 49 in the bushing 57c. The measuring operation may then be repeated with regard to the third land, the actuating rod 81 occupying the position indicated at 113 in Fig. 1. In this fashion the deviation of the third land with regard to the first land can be read upon the gauge 80. In similar fashion the fourth land of the tap may be measured, the gauge actuating rod 81 occupying the position shown at 114 in Fig. 1 and the pin 49 being disposed in bushing 57d.

It may be desired to interpret the index angle deviations in terms of angles instead of inches. To accomplish this interpretation, the initial positioning of the actuating rod 81 and the setting of the gauge needle 82 to its zero position is the same as hereinbefore described. The turntable may then be rotated and the actuating rod 81 may be disposed into contiguous relationship with the second land. By slowly moving the turntable with the end of the actuating rod in contact with the second land, the gauge needle 82 may be brought to zero. When the needle is thus brought to its zero position the angular deviation may then be read upon the protractor band 107 in conjunction with the vernier scale 102. Thus the deviation will be in terms of plus or minus minutes. This angular measurement may be secured throughout all the lands of the tap.

If the tap under test is a left-hand tap, that is, a tap for cutting left-hand threads, the apparatus is initially set up by employing the right-hand alignment mechanism 100. In this fashion the left-hand tap is properly oriented. The readings, hereinbefore described, will then be taken on the leading edges of the left-handed tap, but, as can readily be seen, the position of the gauge support will be altered from that illustrated in the drawings. The position of the support for the gauge 80 can readily be changed by swinging the block 64 about the bearing 63. The measurements for the left-handed type of tap will be made in substantially the same fashion as hereinbefore described.

If a two-flute right-handed tap is to be measured the turntable is swung clockwise, as viewed in Fig. 1, to two positions, namely, wherein the pin 49 engages bushing 57a and where pin 49 engages bushing 57c which is diametrically opposite. With a three-flute right-handed tap, bushing 57a is employed, bushing 57e is employed and bushing 57f is employed, said bushings being 120° apart, the turntable being moved clockwise. If a five-flute right-handed tap is to be measured, bushings 57g, 57h, 57i and 57j will be employed along with bushing 57a. If a six-flute right-handed tap is to be measured, measurements will be taken employing bushings 57a, 57k, 57e, 57c, 57f and 57l. In similar fashion taps having seven, eight, nine and ten flutes may have their index angles measured. The position of the bushings on the base is symmetrical about the bushing 57a and, hence, when left-handed taps are measured, the reverse procedure is followed, that is, the turntable is rotated counterclockwise to engage corresponding bushings.

Referring particularly to Figs. 7, 8 and 9, a modification illustrated in Figs. 7, 8 and 9 is directed essentially to the means for holding the tap while the measurements, hereinbefore described, are taken.

The reference numeral 115 indicates a stationary base, similar to base 2, and a turntable 116 is rotatably positioned upon the base 115, the turntable being similar to turntable 3 and carrying the various testing devices, hereinbefore described. For clarity in illustration, however, the various testing devices are not shown in Fig. 7.

A chuck 117 is carried by the base 115 and extends upwardly through the central portion of the turntable 116. The chuck 117 is adapted to carry a centering device 118 which is adapted to fit into the conical female opening provided in the end of tap 119, that is, the opening usually provided in the tap when the tap is manufactured. In relatively small diameter taps a male point is carried by the tap and, hence, if a relatively small tap is being tested upon the device, the member 118 will comprise a female member to register with the male point.

An arcuate supporting arm 120 is mounted upon a radial extension 121 of the base 115 and is secured thereto by means of screws or the like 122. The opposite end of the arm 120 is positioned above the central portion of the turntable and comprises a centering head 123. The centering head 123 comprises a sleeve portion 124 which may, if desired, be formed integral with the arm 120. A centering rod 125 is adapted to be positioned in the sleeve portion 124 and is adapted to be locked therein, as will be hereinafter more fully described.

The sleeve portion 124 is provided with relatively enlarged bores 126 at each end in which laterally movable centering sleeves 127 are positioned, said sleeves embracing the centering rod 125. The outer diameter of the sleeves 127 is slightly smaller than the inner diameter of the bores 126 and, hence, the sleeves, with the shaft 125 may be moved laterally within the bores. The sleeve 124 is also provided with a relatively restricted central bore 128, the inner diameter of which is slightly larger than the outer diameter of the centering rod whereby a degree of lateral freedom of movement is provided for said rod. An annular rib 129 is formed at the central portion of the bore 128 whereby the rib and centering rod fit relatively snugly.

The arrangement is such that the rod 125 may be canted about the rib 129 as a fulcrum, and thus rod 125 may have its axis inclined to the vertical at a relatively small angle, if desired. To adjust the rod within the sleeve four set-screws 130 are threadedly positioned in the walls of the sleeve defining bores 126, the dog points of the set screws being received in sleeves 127. Hence, by the proper manipulation of the set screws 130, the rod 125 may be canted to a desired position about rib 129.

A plate 131 is secured to the outside surface of the head 123 by means of screws 132 or the like and a locking screw 133 may be threadedly positioned through said plate. A locking block 154 is engaged by the end of screw 133, and, hence, after the rod 125 has been properly adjusted by the set screws 130, the rod may be locked in adjusted position by screw 133.

The lower end of the centering rod 125 may be formed with a conical tip 135 which is adapted to engage in the conical recess normally provided in the tap 119. A plate 136 is secured to the end portion of the rod 125 and carries a capstan screw 137. A second plate 138 is slidably related to plate 136 and may be fastened to said latter plate in a desired position by the capstan screw which passes through a slot provided in plate 138. The plate 138, at one end, carries a nose 139 which is adapted to contiguously engage the square surface of the shank of the tap 119. Thus, the shank of tap 119 is confined between nose 139 and point 135 and may be moved when rod 125 is moved, as has been hereinbefore described.

If the tap is of the type having centering points instead of the usual conical recesses in the ends thereof, the end of rod 125 may be provided with a female centering recess instead of the male point 135.

The modification of the invention illustrated in Figs. 7, 8 and 9 is particularly adaptable for centering and holding relatively large taps while they are being measured, as hereinbefore described. However, if desired, the device shown in Figs. 7, 8 and 9 may be employed to hold all sizes of taps thus completely replacing chuck 15.

In addition to carrying out the measurements hereinbefore described, the device comprising the present invention may also be employed in indexing spiral points of taps (gun taps), chamfer angles and also in reading or measuring radial relief angles or "drop-off" angles of taps. Further, portions of the present device may be employed in conjunction with the device described in my copending application for patent Serial No. 446,762 filed July 30, 1954, for a profiling mechanism for measuring the hook and rake angles of a tap. For example, to measure the hook and rake angles of a tap, the tap may be conveniently oriented in the chuck by the aligning mechanisms such as the mechanisms 100 and 101, and by the use of the indicator 80.

Of course, it is to be understood that the device comprising the present invention is not to be limited to the specific uses hereinbefore described. Such uses have merely been set forth for purposes of illustrating and exemplifying the operation of the invention. Hence, the invention is not to be limited except as necessitated by the appended claims.

I claim as my invention:

1. A device for measuring the angles of a fluted cutting tool comprising a stationary base, a turntable rotatably mounted upon said base, holding means carried by said base for carrying a fluted cutting tool substantially centrally above said turntable, an indicator carried by said turntable, means carried by said turntable for aligning a cutting edge of the tool with a predetermined radial line relative to said turntable, an actuating arm upon said indicator for disposition in contact with said cutting edge at substantially right-angles to said radial line whereby a datum reading is indicated upon said indicator, means for disposing said turntable at a predetermined angular position with respect to the first position thereof whereby said actuating arm contacts a cutting edge of said tool angularly removed from said aligned cutting edge to secure a reading upon said indicator which may be compared with said datum reading.

2. A device for measuring the angles of taps having interspersed threaded lands separated by elongated flutes which comprises, a stationary base, a turntable positioned on said base for rotation in a substantially horizontal plane, holding means carried by said base for holding a tap at substantially right-angles to the central portion of said turntable, means for aligning a cutting edge of one of said lands of said tap with a radial line relative to said turntable, means for positioning said turntable at a datum position relative to said base, an indicator mounted upon and movable with said turntable, said indicator having an actuating rod for contacting said aligned cutting edge to secure a datum reading upon said indicator while said turntable is in said datum position, means for disposing said turntable at a predetermined angular position relative to said datum position to permit contact of said actuating rod with a different cutting edge of said tap angularly removed from said first-mentioned cutting edge to secure a second reading upon said indicator which may be compared with said datum reading to relate the positions of said two tap cuting edges.

3. A device for measuring the angles of taps having interspersed threaded lands separated by elongated flutes which comprises, a stationary base, a turntable positioned on said base for rotation in a substantially horizontal plane, a chuck mounted upon said base for holding a tap at substantially right-angles to said turntable, means for aligning a cutting edge of one of said lands of said tap with a radial line relative to said turntable, means for positioning said turntable at a datum position relative to said base, an indicator mounted upon and movable with said turntable, said indicator having an actuating rod for contacting said aligned cutting edge to secure a datum reading upon said indicator while said turntable is in said datum position, said indicator being so mounted upon said turntable as to dispose said actuating rod at substantially right-angles to said radial line, means for disposing said turntable at a predetermined angular position relative to said datum position to permit contact of said actuating rod with a different cutting edge of said tap angularly removed from said first-mentioned cutting edge to secure a second reading upon said indicator which may be compared with said datum reading to relate the positions of said two tap cutting edges.

4. A device for measuring the index angles of taps having interspersed threaded lands separated by elongated flutes which comprises, a stationary base, a turntable positioned on said base for rotation in a substantially horizontal plane, a chuck mounted upon said base for holding a tap at substantially right-angles to said turntable, means for aligning a cutting edge of one of said lands of said tap with a radial line relative to said turntable, means for locking said turntable at a datum position relative to said base, an indicator mounted upon and movable with said turntable, said indicator having an actuating rod for contacting said aligned cutting edge to secure a datum reading upon said indicator while said turntable is in said datum position, means for locking said turntable at separate predetermined angular positions relative to said datum position to permit contact of said actuating rod with different cutting edges of said tap angularly removed from said first-mentioned cutting edge to secure separate readings upon said indicator which may be compared with said datum reading to relate the positions of said tap cutting edges to said datum reading.

5. A device for measuring the index angles of taps having interspersed threaded lands separated by elongated flutes which comprises, a stationary base, a turntable positioned on said base for rotation in a substantially horizontal plane, a chuck mounted upon said base for holding a tap at substantially right-angles to said turntable with its threaded end extending upwardly, means carried by said turntable for aligning a cutting edge of one of said lands of said tap with a radial line relative to said turntable, means for locking said turntable at a datum position relative to said base, an indicator movably mounted upon said turntable and movable with said turntable, said indicator having an actuating rod for contacting said aligned cutting edge to secure a datum reading upon said indicator while said turntable is in said datum position, means for locking said turntable at a predetermined angular position relative to said datum position to permit contact of said actuating rod with a different cutting edge of said tap angularly removed from said first-mentioned cutting edge to secure a second reading upon said indicator which may be compared with said datum reading to relate the positions of said two tap cutting edges.

6. A device for measuring the angles of taps having interspersed threaded lands separated by elongated flutes which comprises, a stationary base, a turntable positioned on said base for rotation in a substantially horizontal plane, a chuck mounted upon said base and positioned through a central aperture provided in said turntable for holding a tap at substantially right-angles to said turntable, means for aligning a cutting edge of one of said lands of said tap with a radial line relative to said turntable, means for positioning said turntable at a datum position relative to said base, a dial indicator calibrated in linear measurement mounted upon and movable with said turntable, said indicator having an actuating rod for contacting said aligned cutting edge to secure a datum reading upon said indicator while said turntable is in said datum position, means for disposing said turntable at a predetermined angular position relative to said datum position to permit contact of said actuating rod with a different cutting edge of said tap angularly removed from said first-mentioned cutting edge to secure a second reading in linear measurement upon said indicator which may be compared with said datum reading to relate the positions of said two tap cutting edges, and means for relating the positions of said two cutting edges in angular measurement comprising, a protractor calibrated in degrees carried by said turntable, and a vernier scale calibrated in fractions of degrees carried by said base in such position that the index of the protractor and the zero reading of said vernier are in alignment with said radial line when said turntable is in its datum position.

7. A device for measuring the index angles of taps having interspersed threaded lands separated by elongated flutes which comprises, a stationary base, a turntable positioned on said base for rotation in a substantially horizontal plane, a chuck mounted upon said base and positioned through a central aperture provided in said turntable for holding a tap at substantially right-angles to said turntable, means for locking said turntable in a datum position relative to said base, means carried by said turntable for aligning a cutting edge of one of said lands of said tap with a radial line relative to said turntable when said turntable is in datum position, an indicator, means for mounting said indicator on said turntable, said indicator having an actuating rod for contacting said aligned cutting edge at right-angles when said turntable is in datum position to secure a datum reading upon said indicator while said turntable is in said datum position, means for disposing said turntable at a predetermined angular position relative to said datum position to permit contact of said actuating rod with a different cutting edge of said tap angularly removed from said first-mentioned cutting edge to secure a second reading upon said indicator which may be compared with said datum reading to relate the positions of said two tap cutting edges.

8. A device for measuring the index angles of taps having interspersed threaded lands separated by elongated flutes which comprises, a stationary base, a turntable positioned on said base for rotation in a substantially horizontal plane, a chuck mounted upon said base for holding a tap at substantially right-angles to said turntable, means for locking said turntable in a datum position relative to said base, means carried by said turntable for aligning a cutting edge of one of said lands of said tap with a radial line relative to said turntable when said turntable is in datum position, said aligning means comprising an arm swingably mounted upon said turntable, a pin carried by said arm, said tap being movable in said chuck to bring the cutting edge of said land into contact with the end of said pin, an indicator, means for mounting said indicator on said turntable, said indicator having an actuating rod for contacting said aligned cutting edge at right-angles when said turntable is in datum position to secure a datum reading upon said indicator while said turntable is in said datum position, means for disposing said turntable at a predetermined angular position relative to said datum position to permit contact of said actuating rod with a different cutting edge of said tap angularly removed from said first-mentioned cutting edge to secure a second reading upon said indicator which may be compared with said datum reading to relate the positions of said two tap cutting edges.

9. A device for measuring the index angles of taps having interspersed threaded lands separated by elongated flutes which comprises, a stationary base, a turntable positioned on said base for rotation in a substantially horizontal plane, a chuck mounted upon said base for holding a tap at substantially right-angles to said turntable, means for locking said turntable in a datum position relative to said base, means carried by said turntable for aligning a cutting edge of one of said lands of said tap with a radial line relative to said turntable when said turntable is in datum position, an indicator, means for mounting said indicator on said turntable, said mounting means comprising a support carried by said turntable, a standard swingably mounted upon said support, and means on said standard for carrying said indicator, said indicator having an actuating rod for contacting said aligned cutting edge at right-angles when said turntable is in datum position to secure a datum reading upon said indicator while said turntable is in said datum position, means for disposing said turntable at a predetermined angular position relative to said datum position to permit contact of said actuating rod with a cutting edge of said tap angularly removed from said first-mentioned cutting edge to secure a second reading upon said indicator which may be compared with said datum reading to relate the positions of said two tap cutting edges.

10. A device for measuring the index angles of taps having interspersed threaded lands separated by elongated flutes which comprises, a stationary base, a turntable positioned on said base for rotation in a substantially horizontal plane, a chuck mounted upon said base and positioned through a central aperture provided in said turntable for holding a tap at substantially right-angles to said turntable, means for locking said turntable in a datum position relative to said base, means carried by said turntable for aligning a cutting edge of one of said lands of said tap with a radial line relative to said turntable when said turntable is in datum position, an indicator, means for mounting said indicator on said turntable, said mounting means comprising a support carried by said turntable, a standard mounted on said support and swingable in a plane at substantially right-angles to the plane of the turntable, and means on said standard for carrying said indicator, said indicator having an actuating rod for contacting said aligned cutting edge at right-angles when said turntable is in datum position to secure a datum reading upon said indicator while said turntable is in said datum position, means for disposing said turntable at a predetermined angular position relative to said datum position to permit contact of said actuating rod with a different cutting edge of said tap angularly removed from said first-mentioned cutting edge to secure a second reading upon said indicator which may be compared with said datum reading to relate the positions of said two tap cutting edges.

11. A device for measuring the index angles of taps having interspersed threaded lands separated by elongated flutes which comprises, a stationary base, a turntable positioned on said base for rotation in a substantially horizontal plane, a chuck mounted upon said base and positioned through a central aperture provided in said turntable for holding a tap at substantially right-angles to said turntable, means for locking said turntable in a datum position relative to said base, means carried by said turntable for aligning a cutting edge of one of said lands of said tap with a radial line relative to said turntable when said turntable is in datum position, an indicator, means for mounting said indicator on said turntable, said mounting means comprising a support carried by said turntable, a standard mounted on said support and swingable in a plane at substantially right-angles to the plane of the turntable, and means on said standard for carrying said indicator, said indicator carrying means being swingable on said standard in a plane at substantially right-angles to the plane in which the standard swings, said indicator having an actuating rod for contacting said aligned cutting edge at right-angles when said turntable is in datum position to secure a datum reading upon said indicator while said turntable is in said datum position, means for disposing said turntable at a predetermined angular position relative to said datum position to permit contact of said actuating rod with a different cutting edge of said tap angularly removed from said first-mentioned cutting edge to secure a second reading upon said indicator which may be compared with said datum reading to relate the positions of said two tap cutting edges.

12. A device for measuring the angles of a fluted cutting tool comprising a stationary base, a turntable rotatably mounted upon said base, holding means carried by said base for carrying a fluted cutting tool substantially centrally above said turntable, said holding means comprising an arm carried by said base and having an end portion overhanging said turntable, centering means carried by said base and extending through an aperture in said turntable, and means carried by said overhanging portion of said arm for confining the cutting tool between the arm and said centering means, an indicator carried by said turntable, means carried by said turntable for aligning a cutting edge of the tool with a predetermined radial line relative to said turntable, an actuating arm upon said indicator for disposition in contact with said cutting edge at substantially right-angles to said radial line whereby a datum reading is indicated upon said indicator, means for disposing said turntable at a predetermined angular position with respect to the first position thereof whereby said actuating arm contacts a cutting edge of said tool angularly removed from said aligned cutting edge to secure a reading upon said indicator which may be compared with said datum reading.

No references cited.